UNITED STATES PATENT OFFICE.

OSCAR BALLY, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

ANTHRACENE COMPOUND AND PROCESS OF MAKING SAME.

No. 809,893.      Specification of Letters Patent.      Patented Jan. 9, 1906.

Application filed October 10, 1905. Serial No. 282,184.

*To all whom it may concern:*

Be it known that we, OSCAR BALLY, doctor of philosophy and chemist, a citizen of the Swiss Republic, residing at Mannheim, in the Grand Duchy of Baden, and HUGO WOLFF, doctor of philosophy and chemist, a subject of the Grand Duke of Baden, residing at Ludwigshafen-on-the-Rhine, in the Kingdom of Bavaria, German Empire, have invented new and useful Improvements in Anthracene Compounds and Processes of Making the Same, of which the following is a specification.

In the specification of Letters Patent No. 786,085 is described the production of new compounds of the anthracene series by condensing together glycerin, or an equivalent thereof, and a beta-amidoanthraquinon body, these new compounds containing a special group to which the name "benzanthrone" group has been given.

The present invention consists in the production of analogous compounds from alpha-amidoanthraquinon bodies, as hereinafter defined, and the obtainment of coloring-matters therefrom.

Majert, in the specification of German Patent No. 26,197, describes the condensation of glycerin with various amidoanthraquinons and states that he thus obtains anthraquinon-quinolins. The only alpha-amidoanthraquinon known at the date of this German patent were the 1.5 and 1.8 diamidoanthraquinons obtained by nitrating anthraquinon with nitric acid in the presence of sulfuric acid and then reducing the dinitro compounds so obtained, and we have repeated Majert's experiments and have found that these two diamidoanthraquinons on being condensed with glycerin do yield anthraquinon-quinolins, but do not yield any benzanthrone compound. We have discovered that all the other amidoanthraquinons containing an amido group in the alpha position which are known at the present time, with the exception of alpha-amido-alizarin, on being condensed with glycerin or an equivalent thereof—such, for instance, as its anhydrids and esters—yield benzanthrone compounds. These new compounds are of use in the preparation of coloring-matters, for (similarly to those obtained from the beta-amidoanthraquinons) on being melted with caustic alkali they yield violet-blue coloring-matters. The amidoanthraquinons which can be used for the purposes of our invention include alpha-amidoanthraquinon, 1.4-diamidoanthraquinon and 1.2-amido-hydroxy-anthraquinon, and, of course, in any case their homologues, sulfoacids, and halogen derivatives may be employed.

The new compounds obtained according to our invention contain a benzanthrone grouping and consist, when dry, of brown powders, which are soluble in concentrated sulfuric acid, yielding yellow to brown solutions with green fluorescence.

The following examples will serve to further illustrate the nature of our invention and the way in which it can be carried into practical effect; but our invention is not confined to these examples. The parts are by weight.

Example 1: Dissolve twenty (20) parts of alpha-amidoanthraquinon in three hundred (300) parts of sulfuric acid, (containing eighty-two (82) per cent. of $H_2SO_4$,) add eighteen (18) parts of glycerin and heat the mass for about half an hour (thirty minutes) at a temperature of from one hundred and fifty (150) to one hundred and fifty-five (155) degrees centigrade. Allow the mixture to cool, then pour it onto ice, and filter off the condensation product, which separates out in yellowish-brown flakes. When dry, it is a yellowish-brown powder which is insoluble in water, but which is partly soluble in dilute acids, and from such solutions it can be precipitated by the addition of alkali. Its solution in concentrated sulfuric acid is yellowish-brown and has a strong green fluorescence. It yields reddish-yellow solutions in alcohol, benzene, and xylene, and it can be purified by recrystallization from alcohol and obtained in golden-yellow leaflets. Thus purified the compound is completely soluble in dilute acids and has a melting-point of two hundred and fifty-seven (257) degrees centigrade. It dissolves in concentrated sulfuric acid, yielding a golden-yellow solution with a strong green fluorescence.

Example 2: Dissolve ten (10) parts of 1.4-diamidoanthraquinone in two hundred (200) parts of sulfuric acid (containing ninetyeight (98) per cent. of $H_2SO_4$) and add, slowly, forty (40) parts of ice. Add twelve (12) parts of glycerin and heat the mixture for about forty-five (45) minutes to a temperature of one hundred and fifty (150) degrees centigrade. When the mixture is cold, pour it into water and filter off the condensation product, which separates out in brown flakes, which when dry constitute a brown powder which is insoluble in water, but is partly soluble in dilute acids, and it can be precipitated from such solutions by the addition of alkali. It is soluble in concentrated sulfuric acid, yielding a yellowish-brown solution with a green fluorescence.

Example 3: Dissolve ten (10) parts of 1.2-amido-hydroxy-anthraquinon (alpha-alizarin-amid) in two hundred and fifty (250) parts of sulfuric acid (containing about eighty-two (82) per cent. of $H_2SO_4$) and add ten (10) parts of glycerin. Heat the mixture at a temperature of one hundred and fifty (150) degrees centigrade until all the alizarin amid has been acted upon. Pour the melt into a large excess of water and filter. The condensation product is a brown powder, which can be crystallized from dilute alcohol, and thus be obtained as small brown needles which can be dissolved in concentrated sulfuric acid, yielding a yellow solution with a slight green fluorescence. The said needles are also soluble in caustic-soda solution, yielding a violet-red solution with a dark green fluorescence.

Now what we claim is—

1. The process for the production of anthracene compounds by condensing a hereinbefore-defined alpha-amidoanthraquinon body with glycerin.

2. The process for the production of anthracene compounds by condensing a hereinbefore-defined alpha-amidoanthraquinon body with glycerin in the presence of sulfuric acid.

3. The process for the production of anthracene compound by condensing alpha-amidoanthraquinon with glycerin in the presence of sulfuric acid.

4. As new articles of manufacture the anthracene compounds obtainable by condensing a hereinbefore-defined alpha-amidoanthraquinon body with glycerin, which compounds contain a benzanthrone grouping and which, when dry, consist of brown powders which are soluble in concentrated sulfuric acid yielding yellow to brown solutions with green fluorescence and which on melting with caustic alkali yield violet-blue coloring-matters.

5. As a new article of manufacture the anthracene compound obtainable by condensing alpha-amidoanthraquinon with glycerin, which compound contains a benzanthrone grouping and which, when dry, consists of a brown powder which is soluble in concentrated sulfuric acid yielding a yellowish-brown solution with a green fluorescence and which on melting with caustic alkali yields a violet-blue coloring-matter.

In testimony whereof we have hereunto set our hands in the presence of two subscribing witnesses.

OSCAR BALLY.
HUGO WOLFF.

Witnesses:
ERNEST F. EHRHARDT,
J. ALEC. LLOYD.